United States Patent [19]
Fadden et al.

[11] 3,738,191
[45] June 12, 1973

[54] FRICTION BRAKE FOR A HYDRAULIC DRAFT CONTROL LEVER

[75] Inventors: Donald K. Fadden, Clarendon Hills; Harold J. De Groot, Downers Grove, both of Ill.

[73] Assignee: International Harvester Company, Chicago, Ill.

[22] Filed: Sept. 13, 1971

[21] Appl. No.: 179,886

[52] U.S. Cl. ................................................ 74/531
[51] Int. Cl. .............................................. G05g 5/06
[58] Field of Search ............... 74/531; 308/26, 63, 308/65, DIG. 7; 188/67, 83

[56] References Cited
UNITED STATES PATENTS

| | | | |
|---|---|---|---|
| 1,231,078 | 6/1917 | Sill | 188/83 |
| 1,906,341 | 5/1933 | Sejersen | 74/531 |
| 1,588,039 | 6/1926 | Monosmith | 188/83 |
| 2,675,283 | 4/1954 | Thomson | 308/DIG. 7 |

FOREIGN PATENTS OR APPLICATIONS

| | | | |
|---|---|---|---|
| 409,604 | 2/1945 | Italy | 74/531 |

*Primary Examiner*—Charles J. Myhre
*Assistant Examiner*—R. H. Lazarus
*Attorney*—Floyd B. Harman

[57] ABSTRACT

A friction brake having a base member fashioned to provide a weakened portion which comprises, an annular split ring having a closing means and a cold flowing plastic sleeve. In a relaxed position, the inner diameter of the annular split ring defines a circle, further when torqued tight around a control lever, a second circle is defined, due to the bend characteristics of the weakened portion. Thus, compression forces are distributed equally over the surface of the control shaft prolonging the useful life of the sleeve.

4 Claims, 2 Drawing Figures

PATENTED JUN 12 1973          3,738,191

# FRICTION BRAKE FOR A HYDRAULIC DRAFT CONTROL LEVER

BACKGROUND OF THE INVENTION

This invention relates to a friction brake on a hydraulic draft control lever of the type used for operating a three-point type hitch or implement attaching linkage associated with an agricultural tractor vehicle. More particularly, it relates to a friction brake employed in a hydraulic draft controlled system which can be adjusted to define a circle about a shaft thereby providing uniform compressive forces against the shaft prolonging the parts thereof.

Friction brakes are well known in the art and usually consist of a resilient member, which is a compression spring or Bellville washer urging or compressing the friction material against the member to be secured. Many such prior art friction brakes are of a complicated design, are costly to assemble and manufacture, and frequently require servicing or adjustment as the friction disc material becomes worn. Additionally, such brakes partially expose the gripped surface of the restrained member to dirt and moisture thereby promoting rusting and additional grinding or scouring of the component parts.

It is, therefore, an object of this invention to provide a friction brake which is so constructed and arranged that under working conditions, uniform compressive forces are exerted uniformly across the surface of the member being clamped.

Yet another object of this invention is to provide a plastic sleeve which facilitates the distribution of compressive forces by cold flowing and prevents any metal to metal contact.

A further object of this invention is to provide a sleeve means which insulates the clamped surface from dirt, oil, moisture, etc.

Still another object of this invention is to provide a friction brake having a prolonged life and being free of constant maintenance.

Another object of this invention is to provide a friction brake having bending and deforming characteristics such that in operation, a first larger circle will be deformed to form a second smaller circle.

Yet another object of this invention is to provide a load-carrying friction brake means which simultaneously functions as a brake and as a load-carrying bearing.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 shows a sectional view of the friction brake showing details of the hydraulic draft control levers; and FIG. 2 illustrates a section of the friction brake taken on the line 2—2 of FIG. 2.

DESCRIPTION OF THE PREFERRED EMBODIMENT

Figure 1:
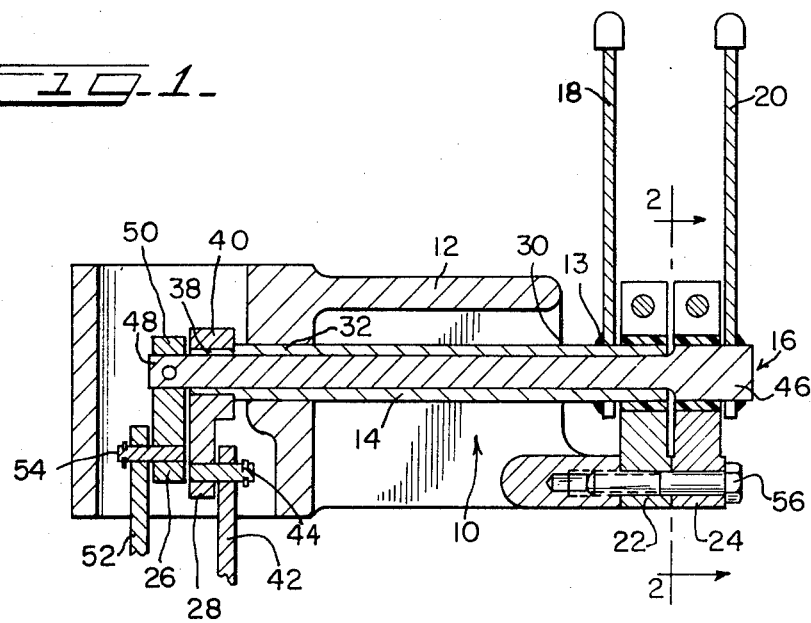

Referring now to the drawings wherein like reference characters designate like or corresponding parts throughout the several views, there is shown in FIG. 1 a hydraulic draft control means 10 supported on a frame means 12. The draft control means 10 includes a sleeve means or hollow shaft 14, a shaft means 16 journalling sleeve means 14, control handle lever means 18 and 20, friction brakes 22 and 24 and control mechanism linkage means 26 and 28.

The handle lever means 18 is fixed to first end extreme 13 of sleeve means 14 and pivots down into and out of the plane of the drawing. The sleeve means 14 frame means 12 at 30 and journals frame means 12 at 32, bearing surface means being provided to allow pivotal movement thereabout. The control mechanism linkage means 28 includes a first lever means 40 fixed to the second end extreme 38 of sleeve means 14 in following relationship therewith, such that movement of lever means 18 is transmitted thereto.

A first output lever means 42 is pivotally fixed to first lever means 40 by a pin means 44. In operation, lever means 18 actuates a hydraulic system (not shown) that, through sleeve means 14 and lever means 40 and 42, controls the positioning of the tractor hitch (not shown).

The handle lever means 20 is fixed to end extreme 46 of shaft means 16 and pivots in the same plane as handle lever means 18. Shaft means 16 journals and is pivotally supported by sleeve means 14, the end extremes 46 and 48 extending out and beyond the corresponding end extremes 13 and 38 of sleeve means 14.

The control mechanism linkage means 26 includes a second lever means 50 fixed to end extreme 48 of shaft means 16 in following relationship therewith. A second output lever means 52 is pivotally secured to second lever means 50 by a suitable means such as pin means 54.

In operation, lever means 20, through pivotally mounted shaft means 16 and lever means 50 and 52, actuates a hydraulic system (not shown) that controls the predetermined load range to which the system will respond. That is for selecting a desired working depth of the implement with corresponding automatic draft control.

As shown in FIG. 1, the end extremes 13 and 46 are clamped by friction brake means 22 and 24. Bolt means such as 56, secures the braking means 22 and 24 to the frame 12 in a piggy back fashion.

It should be noted that the end extremes 13 and 46 are both of the same diameter. This permits one type of friction braking means to be used, that is, complete interchangability of parts. Further hereafter brake means 22, shown in FIG. 2, will be discussed with the understanding that brake means 24 is identical.

In operation the friction brake means 22 and 24 restrain the movement of the corresponding shaft means against movement by internal forces such that infinite position adjustment of the tractor hydraulic control lever is possible. Yet the required clamping action of the friction brake is not strong enough to interfere with the movement of the handle means by the operator. Further, the friction brake means serves as the sole pivotal bearing support points for handles 18 and 20 avoiding the need for a means to support end extreme 13 and 46 against deflection and thus are load-carrying.

Figure 2:
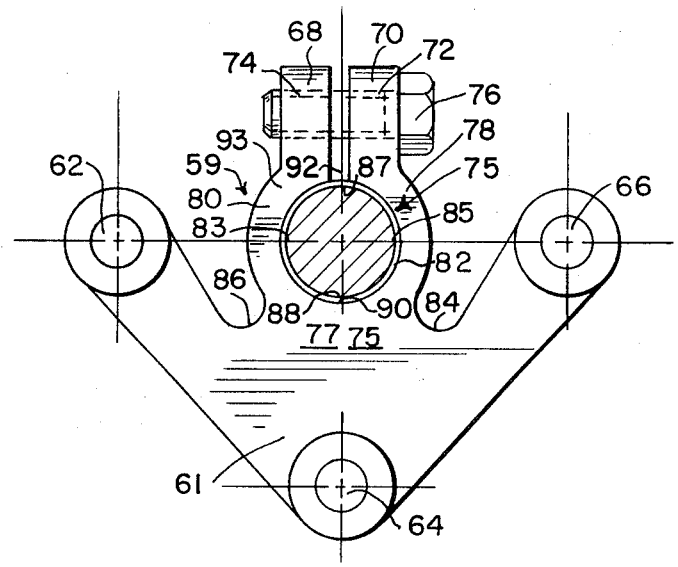

As shown in FIG. 2, friction brake means 22 comprises an annular split ring means 59 being integrated with a support means 61 of a general wing-shaped configuration, the major portion thereof being separated from the support means by gaps, clefts or cutout portions 84 and 86. The extremes of supporting means 61, 62, 64 and 66 are apertured allowing the passage of bolts such as 56, thereby allowing securement to the frame 12. The split ring means 59 is provided at its top extreme 93 and 95 with spaced parallel ears 68 and 70, each being provided with corresponding apertures 72 and 74, aperture 74 being threaded to allow threaded engagement with bolt 76. The aperture 75 is such that when the split ring means is in a relaxed position, it defines a perfect circle.

In operation, as the adjustable closing means or bolt 76 is torqued tight, the split ring portions 78 and 80 bend such that, in the preferred embodiment, a nylon bushing 82 of a sleeve or strip type is clamped against the adjacent shaft or sleeve means.

We have determined that in order to achieve optimum results and service, the nature of the spaced gaps or cutout portions 84 and 86 is important. That is, to avoid excessive wear and the necessity of repeated adjustment of bolt 76, uniform pressure must be maintained around the circumference of the shaft or sleeve means. The nature of the clamping forces is determined by the bend characteristics of the split ring portions 78 and 80 which are, in turn, controlled by the geometry and location of the cutout portions 84 and 86. If the cutouts were too extensive, an insufficient integrated portion 75 would exist in common with bottom extreme 77 and the split ring portions 78 and 80 and thus split ring 59 is rigid and has sufficient load bearing characteristics to carry operator imposed as well as hydraulic system generated loading. Conversely if there were no cutout portions, bending would take place in ears 68 and 70.

In practice we have found that the proper design is such that as split ring portions 78 and 80 are clamped against shaft sections 83 and 85, sufficient bend and distortion is provided such that ears 68 and 70 can press down on shaft 16 and 87 forcing the opposite side 88 thereof against the bottom 90 of aperture 75. Thus, because of the gap 92 between ears 68 and 70 and the bend in split ring portions 78 and 80, a second smaller approximate circle around the shaft is defined. If insufficient bend was provided, a semi-elliptical aperture would result and only a small amount of the original nylon bushing circumference would function as a wear surface.

The cold flow properties of nylon provide still another means for achieving a constant uniform clamping force over the surface of the shaft means. That is, the nylon or self-pressure equalizing means tends to flow from the areas of high compression such as near 83, 85, 87 and 88 into the corresponding adjacent areas of possible lower compression, having as a general effect the uniform distribution of compressive forces.

The nylon strip 82 is cut into a parallelogram such that when wrapped around shaft 16, exposure of shaft 16 is nearly non-existant between ears 68 and 70, thus dirt, oil, sand, moisture, etc. cannot filter into the area subjected to compressive forces. Thus, unnecessary grinding or cutting action which would tend to cause non-work related wear of the nylon sleeve is avoided, prolonging the life of the strip. It should be understood that a solid nylon sleeve of proper dimensions would also function satisfactorily.

The invention may be embodied in other specific forms without departing from the spirit or essential characteristics thereof. The present embodiments, are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A friction brake being free of constant maintenance and providing infinite adjustment control for a tractor hydraulic control lever comprising:
   a support means having spaced gaps;
   an annular split ring means having an inner diameter defining a first circle, and having top and bottom extremes, said bottom extreme being fixed to said support means between said gaps and said top extreme having a closing means whereby varying pressure can be exerted on said control lever; and
   a cold flowing plastic means provided in said annular split ring, whereby upon insertion of said control lever in said annular split ring and actuation of said closing means said split ring bends and distorts defining a second smaller circle which completely surrounds the entire circumference of said control lever, whereby uniform pressure is exerted around said smaller circle.

2. The friction brake of claim 1 wherein said plastic means is a nylon sheet.

3. The friction brake of claim 1 wherein said closing means includes apertured spaced parallel ears provided with a bolt means.

4. A hydraulic draft control system having a control lever fixed to a pivotally mounted shaft for controlling a hydraulic system, wherein the improvement comprises:
   a friction brake clamping said shaft against movement by internal forces including:
   a support means having spaced gaps;
   an annular split ring means having an inner diameter defining a first circle and top and bottom extreme, said bottom extreme being fixed to said support means between said gaps, said top means having a closing means whereby shaft clamping pressure can be varied; and
   a cold flowing plastic means provided in said annular split ring, whereby upon insertion of said control lever in said annular split ring and actuation of said closing means said split ring bends defining a second smaller approximate circle which completely surrounds the entire circumference of said control lever, whereby uniform pressure is exerted around said smaller circle.

* * * * *